US006097243A

United States Patent [19]

Bertin et al.

[11] Patent Number: 6,097,243

[45] Date of Patent: Aug. 1, 2000

[54] DEVICE AND METHOD TO REDUCE POWER CONSUMPTION IN INTEGRATED SEMICONDUCTOR DEVICES USING A LOW POWER GROGGY MODE

[75] Inventors: Claude L. Bertin, South Burlington; William Robert Patrick Tonti; Alvar Antonio Dean, both of Essex Junction; Wilbur David Pricer, Charlotte; Patrick Edward Perry, Shelburne; Kenneth J. Goodnow, Essex Junction; Sebastian T. Ventrone, South Burlington, all of Vt.

[73] Assignee: International Business Machines Corporation, Armonk, N.Y.

[21] Appl. No.: 09/159,861

[22] Filed: Sep. 24, 1998

Related U.S. Application Data

[63] Continuation-in-part of application No. 09/120,211, Jul. 21, 1998.

[51] Int. Cl.[7] .......... G05F 1/10

[52] U.S. Cl. .......... 327/544; 327/543; 327/540

[58] Field of Search .......... 327/530, 534, 327/535, 540, 541, 543, 544, 537, 545, 113, 119, 117, 291

[56] References Cited

U.S. PATENT DOCUMENTS

| | | | |
|---|---|---|---|
| 4,137,563 | 1/1979 | Tsunoda | 364/200 |
| 4,893,271 | 1/1990 | Davis et al. | 364/900 |
| 4,905,199 | 2/1990 | Miyamoto | 365/226 |
| 5,025,387 | 6/1991 | Frane | 364/493 |
| 5,220,672 | 6/1993 | Nakao et al. | 395/750 |
| 5,247,655 | 9/1993 | Khan et al. | 395/550 |
| 5,378,935 | 1/1995 | Korhonen et al. | 327/114 |
| 5,406,064 | 4/1995 | Takahashi | 235/492 |
| 5,420,528 | 5/1995 | Shigehara | 326/98 |
| 5,426,755 | 6/1995 | Yokouchi et al. | 395/425 |
| 5,438,548 | 8/1995 | Houston | 365/227 |
| 5,560,020 | 9/1996 | Nakatani et al. | 395/750 |
| 5,587,672 | 12/1996 | Ranganathan et al. | 326/93 |
| 5,594,371 | 1/1997 | Douseki | 326/119 |
| 5,602,790 | 2/1997 | Mullarkey | 365/211 |
| 5,610,533 | 3/1997 | Arimoto et al. | 326/33 |
| 5,630,143 | 5/1997 | Maher et al. | 327/534 |
| 5,661,751 | 8/1997 | Johnson | 375/219 |
| 5,672,995 | 9/1997 | Hirase et al. | 327/534 |
| 5,793,691 | 8/1998 | Mullarkey | 365/211 |
| 5,821,769 | 10/1998 | Douseki | 327/534 |
| 5,838,047 | 11/1998 | Yamauchi et al. | 257/372 |
| 5,892,260 | 4/1999 | Okumura et al. | 257/347 |

*Primary Examiner*—Timothy P. Callahan
*Attorney, Agent, or Firm*—Schmeiser, Olsen & Watts; Eugene I. Shkurko

[57] ABSTRACT

According to the preferred embodiment, a device and method for reducing power consumption by reducing unneeded node toggling is provided. The preferred embodiment reduces unneeded node toggling in a circuit by utilizing either a pull-up or pull-down transistor to pull the input of the circuit to a state that minimizes power consumption during periods in which the circuit is inactive. By tying the circuit input high or low during inactivity, node toggling is reduced or eliminated in that circuit. In the preferred embodiment, the inputs to the circuit all pulled after a time of inactivity which is proportional to the leakage current of the leakiest transistor in the circuit. By timing the input pulling proportional to the leakage current, the power consumption is minimized without excessive power loss caused by the pulling itself.

34 Claims, 4 Drawing Sheets

100
PULSE STRETCHER 110
S
R
OR 108
OR 108
OR 108
INTERUPT 109
ACTIVITY INPUT 106
TRANS. DET. 104
TRANS. DET. 104
TRANS. DET. 104
TRANS. DET. 104
TRANS. DET. 104
CIRCUIT 102
Vt_n
Vt_p
VOLTAGE REGULATOR 128
LATCH 112
S
R
114
SINGLE SHOT 116
DELAY 118
122
SINGLE SHOT 124
DELAY 120
LATCH 126
S
R
TWO SPEED CLOCK 130

DEVICE AND METHOD TO REDUCE POWER CONSUMPTION IN INTEGRATED SEMICONDUCTOR DEVICES USING A LOW POWER GROGGY MODE

RELATED APPLICATIONS

This case is a continuation-in-part of Dkt. No. BU9-97-220, entitled "LOW POWERING APPARATUS FOR AUTOMATIC REDUCTION OF POWER IN ACTIVE AND STANDBY MODES" by Dean et al., U.S. Ser. No. 09/120,211, filed on Jul. 21, 1998; and is related to Dkt. No. BU9-97-220V, entitled "ASIC LOW POWER ACTIVITY DETECTOR TO CHANGE THRESHOLD VOLTAGE" by Dean et al., U.S. Ser. No. 09/159,898, filed concurrently. Both related applications are assigned to the assignee of record and are incorporated herein by reference.

BACKGROUND OF THE INVENTION

1. Technical Field

This invention generally relates to semiconductor devices, and more specifically relates to power conservation in semiconductor devices.

2. Background Art

The proliferation of electronics in our modern world is in large part due to integrated circuit semiconductor devices. Integrated semiconductor devices are designed and used in almost every electronic device today. In many applications power consumption is a critical issue for several reasons. For example, in portable devices such as wireless telephones, battery life and battery size are primary design concerns. Consumers want the portable electronic device to run as long as possible using a single battery charge and also want the device, including the battery to be as small and portable as possible. Thus, it is strongly desirable to be able to decrease power consumption of the device such that battery life can be extended and/or the size of the battery decreased.

In other applications power consumption is critical because it is directly related to the amount of heat generated by a device. A semiconductor device that consumes more power will generate more heat. In applications where heat sensitivity is a critical factor, reducing the power consumption reduces the heat generated by the device.

To achieve low-power consumption, many portable systems have a "sleep mode" or "standby mode" that reduces power consumption during periods of inactivity. During these prior art sleep modes, portions of the system are shut down and other portions operate at a reduced clock frequency. Turning non-essential portions of the system "off" and having the remainder of the system operating at reduced clock frequency reduces the power consumption during inactivity. Then, when an input stimulus is detected, the clock frequency is brought back up to full-speed and previously off portions of the system are turned back on.

While these systems reduce power consumption during periods of inactivity, they also have several disadvantages. These disadvantages include a lag time between "sleep" and full functionality of the system. In particular, because during sleep mode a portion of the system is effectively turned off, the system cannot immediately respond with full functionality when needed. Instead, the system must turn on the portions turned off during sleep, and then load or unload any data needed to or from the previously off portions before full functionality of the system returns. This lag time needed to return from sleep to full functionality makes sleep mode unacceptable for systems that require instantaneous functionality when an input stimulus is encountered.

Therefore, there existed a need to provide reduced power consumption by reducing power consumption during inactivity while maintaining the ability to become instantly active with full functionality.

DISCLOSURE OF INVENTION

According to the present invention, a device and method for reducing power consumption while maintaining full functionality is provided. The preferred embodiment reduces power consumption by putting devices or portions of devices into a "groggy mode" during periods of inactivity. The preferred groggy mode includes reducing operational clock speed and then increasing the source-to-body voltage bias. Increasing the source-to-body voltage bias reduces the sub-threshold current of integrated circuit device's transistors, significantly reducing power consumption during periods of inactivity while maintaining fully functionality at reduced operational clock speeds. When a device in groggy mode is again needed it can instantly respond to input stimuli at the reduced operational clock speed. The source-to-body voltage bias is then decreased, and the clock speed is increased to the normal operational level. Thus, in the preferred embodiment inactive devices are put into a groggy mode where they consume less power while maintaining full functionality at reduced speeds. These devices thus retain the ability to immediately respond when needed and they can be quickly brought up to full operational speed.

The foregoing and other features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

BEST MODE FOR CARRYING OUT THE INVENTION

According to the present invention, a device and method for reducing power consumption while maintaining full functionality is provided. The preferred embodiment reduces power consumption by putting devices or portions of devices into a "groggy mode" during periods of inactivity. The preferred groggy mode includes reducing operational clock speed and then increasing the source-to-body voltage bias. Increasing the source-to-body voltage bias reduces the sub-threshold current of the device's transistors, significantly reducing standby power consumption during periods of inactivity while maintaining full functionality at reduced operational clock speeds. When a device in groggy mode is again needed it can instantly respond to input stimuli at the reduced operational clock speed. The source-to-body voltage bias is then decreased, and the clock speed is increased to the normal operational level.

Figure 1:
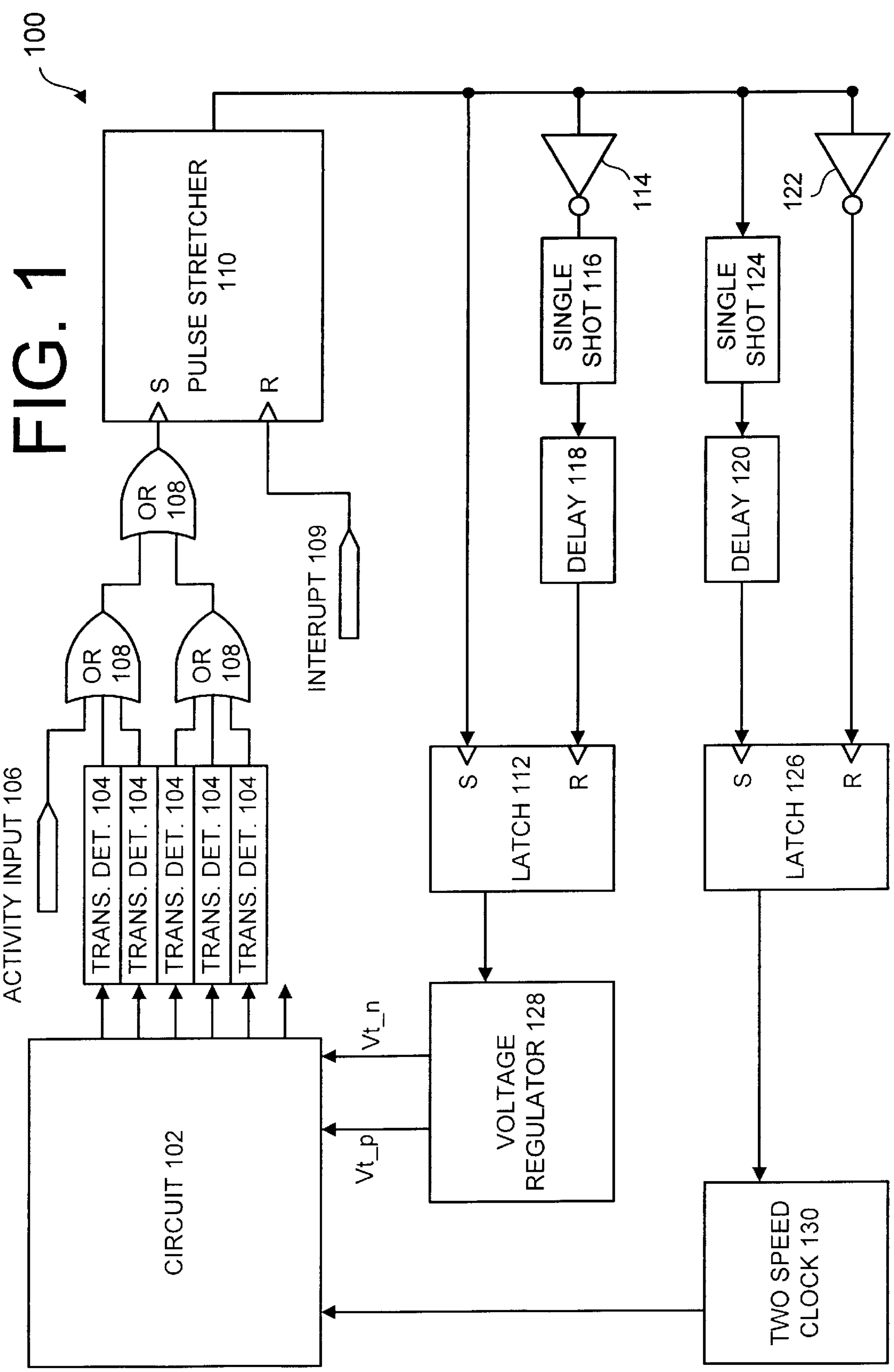
FIG. 1 is a schematic view logic circuit and a mechanism for putting the logic circuit into and out of groggy mode in accordance with the preferred embodiment.

Turning now to FIG. 1, a system 100 in accordance with the preferred embodiment is illustrated. System 100 includes a circuit 102 and a groggy mode mechanism for putting the circuit 102 in and out of groggy mode. The groggy mode mechanism includes transition detectors 104, activity input 106, OR gates 108, pulse stretcher 110, inverters 114 and 122, single shots 116 and 124, delays 118 and 120, latches 112 and 126, voltage regulator 128 and two speed clock 130.

The general operation of system 100 is as follows. Transition detectors 104, activity input 106, OR gates 108 and pulse stretcher 110 are used to control when circuit 102 is released from groggy mode by detecting signal transitions that are indicative of activity and providing a signal that returns circuit 102 to groggy mode after a predetermined period of inactivity. Voltage regulator 128 changes the source-to-body biases of transistors in circuit 102, increasing the bias during inactivity to reduce sub-threshold current drain. Two speed clock 130 adjusts the clock speed of circuit 102, decreasing the clock speed when circuit 102 is put into groggy mode and increasing to normal speed during periods of high activity. Inverters 114 and 122, single shots 116 and 124, delays 118 and 120 and latches 112 and 126 control the order of operation. In particular, when circuit 102 is put into groggy mode they assure the clock speed is lowered before the source-to-body bias is increased. Likewise, when the circuit 102 is taken out of groggy mode they assure the source-to-body bias is decrease before the clock speed is increased to normal speed.

The circuit 102 can comprise any type of device in which power conservation during periods of inactivity is desired where full functionality must be available instantly. As such, circuit 102 can comprise system chips, microprocessors, microcontrollers, application specific integrated circuits (ASICs), digital signal processors (DSPs) or any other circuit that is used in devices in which power consumption and instantaneous functionality are important factors. The preferred embodiment is thus particularly applicable to circuits in battery powered equipment such as portable phones, personal digital assistants (PDAs) and other devices whose interaction is usually characterized by long periods of inactivity punctuated by moments of intense activity where the operator either needs or wants instantaneous full functionality.

Figure 2:
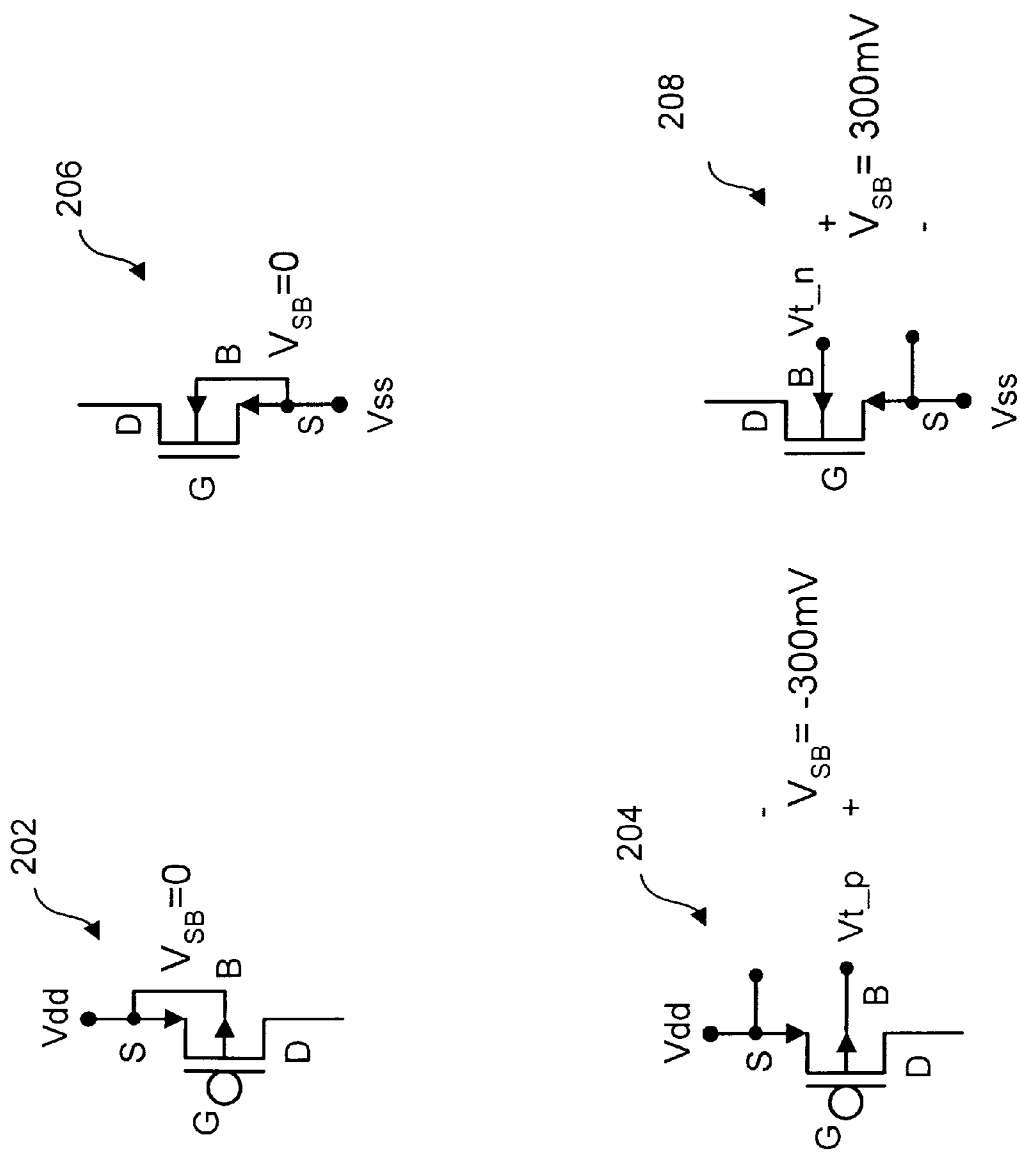
FIG. 2 is a schematic view of exemplary n and p channel transistors with source-to-body bias illustrated.

In the preferred embodiment, circuit 102 is taken in and out of groggy mode by adjusting the source-to-body voltage of transistors in circuit 102 and adjusting the clock speed of circuit 102. Turning to FIG. 2 two exemplary p-channel transistors 202 and 204 and two exemplary n-channel transistors 206 and 208 are illustrated schematically. In most normal CMOS circuits, the source-to-body bias of n-channel and p-channel devices is zero. Typically, the bodies of all p-channel transistors are tied directly with their sources and to Vdd, while the bodies of all n-channel transistors are tired directly to their sources and to Vss. This is illustrated with p-channel transistor 202 and n-channel transistor 206.

In the preferred embodiment, the transistors of circuit 102 are connected such that they can be operated in normal mode (i.e., with a source-to-body bias ($V_{SB}$) of zero) and in groggy mode (i.e., with an increased source-to-body bias ($V_{SB}$)). In groggy mode, the source-to-body voltage ($V_{SB}$) is increased to lessen power consumption during periods of inactivity. This is illustrated with p-channel transistor 204 and n-channel transistor 208. Instead of tying the body and source together to Vdd in p-channel transistors, the body is connected to Vt_p so it can be driven higher than Vdd a predetermined amount during periods of inactivity. In the example illustrated in FIG. 2, the body of p-channel transistor 204 is driven 300 mV above Vdd, and thus $V_{SB}$=−300 mV. Likewise, instead of tying the body and source together to Vss in n-channel transistors, the body is connected to Vt_n so it can be driven lower than Vss a predetermined amount during periods of inactivity. In the example illustrated in FIG. 2, the body is driven 300 mV below Vss, and thus $V_{SB}$=300 mV. By increasing the bias between body and source, the sub-threshold current of the transistors is significantly reduced during periods of inactivity.

During periods of activity, the Vt_p can be set at Vdd, resulting in a $V_{SB}$=0 such that the p-channel transistors can operate at full speed. Likewise, Vt_n can be set at Vss, resulting in a $V_{SB}$=0 such that the n-channel transistors can operate at full speed.

The amount of bias applied between body and source ($V_{SB}$) during periods of inactivity is preferably selected based on several factors. Typically it is desirable to increase $V_{SB}$ such that sub-threshold current is significantly decreased without increasing $V_{SB}$ so much that it takes excessive time to exit groggy mode. As an example, a preferred $V_{SB}$ of ±300 mV will typically decrease the sub-threshold current by a factor of 100 without excessive increasing the time to exit groggy mode.

Figure 3:
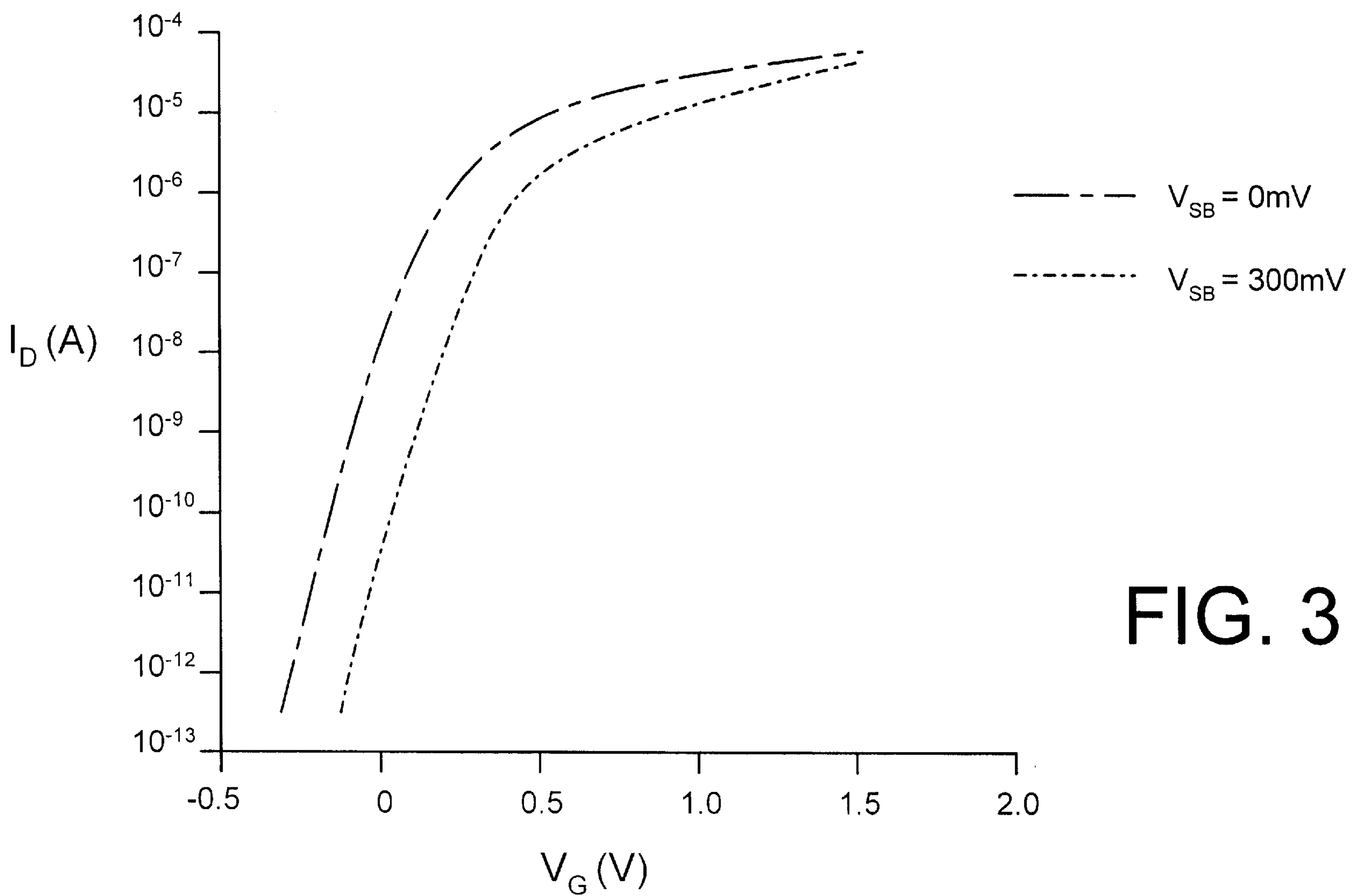
FIG. 3 is graph illustrating n-channel transistor drain current plotted against gate voltage with source-to-body biases of 0 mV and 300 mV.

Turning to FIG. 3, a graph illustrates the n-channel drain current ($I_D$) plotted against gate voltage ($V_G$) for exemplary transistors with source-to-body biases of 0 mV and 300 mV. This graph illustrates how increasing the source-to-body bias decreases the drain current across the whole range of operation. The top portion of the curves, ($I_D>10^{-6}$) illustrates the drain current when the transistors are active or "on" . The lower portions of the curves, ($I_D<10^{-6}$) illustrate the drain current when the transistors are inactive or "off". The current that flows through the transistor in its off state is generally referred to as the sub-threshold current. Every transistor in an integrated circuit device drains some sub-threshold current during periods of inactivity. The sub-threshold current is typically hundreds of times smaller than the current drained when the transistor is on. The sub-threshold current is small enough that in many applications it is not significant. In some applications, however, such as small battery powered devices, the sub-threshold current drained by each transistor adds up to significant power consumption during periods of inactivity.

As illustrated in FIG. 3, by increasing $V_{SB}$, the transistors are put into "groggy mode" and the sub-threshold current is significantly reduced during periods of inactivity. In FIG. 3 the n-channel drain current is illustrated for $V_{SB}$=0 mV and 300 mV. In this example, the drain current, and in particular the sub-threshold current, for the transistor with $V_{SB}$=300 mV decreases by a factor of approximately 100. This leads to significant power consumption reductions during periods of inactivity.

Returning now to FIG. 1, the preferred groggy mode mechanism takes circuit 102 in and out of groggy mode by adjusting the source-to-body voltage of transistors in circuit 102 and adjusting the clock speed of circuit 102. In normal mode $V_{SB}$=0 and the two speed clock 130 is set to have the transistors operate at full speed. In groggy mode, $V_{SB}$ in both n and p devices is increased to consume significantly less sub-threshold current and the two speed clock 130 is set to operate at a lower speed.

Transition detectors 104 are connected to monitor certain outputs of circuit 102. Preferably, the transition detectors 104 are connected to those outputs where signal transitions are indicative of activity on circuit 102 for which it is desirable to take circuit 102 out of groggy mode. The output of transition detectors 104 are connected through OR gates 108 to pulse stretcher 110. Thus, when a signal transition is detected by any of the transition detectors 104, pulse stretcher 110 receives a set input through OR gates 108.

In addition to monitoring outputs of circuit 102 with transition detectors 104, one or more activity inputs 106 can also be connected to pulse stretcher 110 through OR gates 108. Activity inputs 106 can comprise any type of signal that is also indicative of activity for which it is desirable to take circuit 102 out of groggy mode. As such, activity input 106 can comprise memory access signals, control signals, data valid signals or any other signal that is indicative of future activity in a particular application.

Thus, when any transitions indicative of activity in circuit 102 occur (either from an output of transition detector 104 or activity input 106), pulse stretcher 110 receives a set input through OR gates 108. In the preferred embodiment, pulse stretcher 114 follows the leading edge of the output pulse of the OR gates 108 and extends the width of that output pulse for a predetermined period of time. Thus, the output of pulse stretcher 110 will be active whenever signal transitions indicative of activity are present and for a predetermined time period after that. The amount of time that pulse stretcher 110 extends activity signals would depend upon a particular application. In particular, it would be selected to extend the signal long enough such that the circuit 102 is not put into groggy mode during frequently occurring very short periods of inactivity (e.g., one inactive clock cycle). Conversely, it would not be selected to be so long as to waste power by operating circuit 102 in normal mode too long. As examples, pulse stretcher 110 would generally be preferred to extend signals for between 10 and 100 clock cycles.

The output of the pulse stretcher 110 controls whether circuit 102 is in groggy mode or in normal operating mode. When the pulse stretcher 110 output goes high, the clock speed of circuit 102 is reduced to a slower speed by two speed clock 130 and then the source-to-body bias of transistors in circuit 102 is increased by voltage regulator 128, putting circuit 102 into groggy mode. When the pulse stretcher 112 output goes low, the source-to-body bias of transistors in circuit 102 is decreased by voltage regulator 128 and then the clock speed of circuit 102 is changed to the normal operating speed by two speed clock 130.

In particular, when the pulse stretcher 110 output goes high, latch 112 is set, causing voltage regulator 128 to decrease the source-to-body bias to zero for both n-channel and p-channel transistors in circuit 102. This is preferably done by providing a voltage Vt_p to the body of p-channel devices that is equal to Vdd, and providing a voltage Vt_n to the body of n-channel devices that is equal to Vss. The pulse stretcher 110 output, after passing through single shot 124 and delay 120, sets latch 126 causing the two speed clock to change to the normal high speed operation. This delay 120 is preferably provided to assure that the two speed clock 130 is switched to high speed only after the source-to-body bias has stabilized to zero. This assures that the transistors in circuit 102 are capable of operating at high speed before the high speed clock is activated. Single shot 116 is preferably included in the delay path to provide short well defined reset pulses to latch 112 that will not interfere with subsequent pulses from pulse stretcher 110. It should be noted that preferably only the first few cycles of circuit 102 operation occurs at the slower speed, and that this would typically be unnoticeable to any user.

When circuit 102 has been inactive for a period of time, the pulse stretcher 110 output goes low. Inverter 122 inverts this transition, and resets latch 126. This causes the two speed clock to change to the low "groggy mode" speed. The pulse stretcher 110 output is also inverted by inverter 114 and passed to single shot 116, where it causes a short pulse to be generated. After passing through delay 118, the single shot 116 pulse resets latch 112, causing voltage regulator 128 to increase the source-to-body bias voltage. This is preferably done by providing a voltage Vt_p to the body of p-channel devices that is more than Vdd a predetermined amount, and providing a voltage Vt_n to the body of n-channel devices that is less than Vss a predetermined amount. For example, applying a Vt_p to p-channel devices that is 300 mV above Vdd creates a $V_{SB}$ equal to −300 mV. Applying a Vt_n to n-channel devices that is 300 mV below Vss creates a $V_{SB}$ equal to +300 mV.

The delay 118 is preferably provided to assure that the source-to-body bias is increased only after the two speed clock 130 output has stabilized at the low speed. This is done because increasing the source-to-body voltage also increases the threshold voltage, which slows the device down. Assuring that the source-to-body voltage is increased only after the two speed clock 130 output is stabilized at slow speed assures that transistors with diminished performance are not required to work with a high speed clock. Single shot 124 is preferably included in the delay path to provide short well defined set pulses to latch 126 that will not interfere with subsequent pulses from pulse stretcher 110.

Thus, when activity is detected in circuit 102, it is taken out of groggy mode by changing the source-to-body bias to zero and then changing the operational clock speed to the normal full speed. When circuit 102 is inactive for a period of time, the operational clock speed is slowed and then the source-to-body bias is increased to reduce sub-threshold current.

Figure 4:
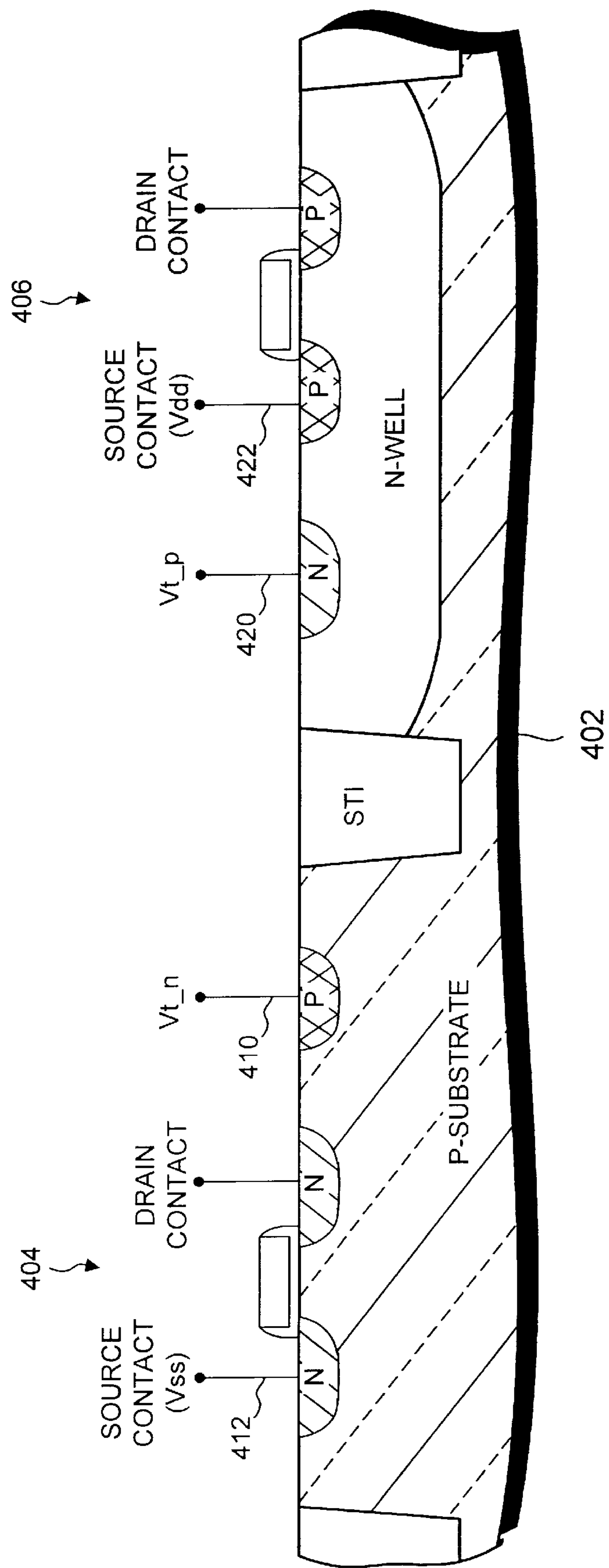
FIG. 4 is cross sectional view of an exemplary n and an exemplary p channel transistor in accordance with the preferred embodiment

Turning now to FIG. 4, a cross sectional view of an n-channel transistor 404 and a p-channel transistor 406 formed in a semiconductor substrate 402 is illustrated. In the preferred embodiment, the source-to-body bias of transistors is increased using body contacts. In particular, the source-to-body bias of n-channel transistors is increased by applying a voltage Vt_n to the body of n-channel devices using a body contact such as contact 410. Again, this is preferably done by applying a voltage Vt_n to the body contact that is less than the Vss applied to the n-channel source contacts, such as contact 412. Likewise, the source-to-body bias of p-channel transistors is increased by applying a voltage Vt_p to the body of p-channel devices using a body contact such as contact 420. Again, this is preferably done by applying a voltage Vt_p to the body contact that is more than the Vdd applied to the p-channel source contacts, such as contact 422.

When the transistors are to operate in normal mode, the Vt_n applied to contact 410 is set to Vss and the Vt_p applied to contact 420 is set to Vdd, resulting in zero source-to-body biases.

It should be noted that the preferred embodiment has the advantage of being easily implemented into standard CMOS technologies. In particular, in most prior art CMOS technologies, all n-channel transistor sources and bodies are tied together to Vss. Likewise, all p-channel transistor sources and bodies are tied together to Vdd. To implement the preferred embodiment, all n-channel bodies can be tied together to Vt_n, while all n-channel sources remain tied together to Vss. Likewise, all p-channel bodies can be tied together to Vt_p while all p-channel sources remain tied together to Vdd. Thus, the bias of all n-channel transistor bodies are adjusted together, and the bias of all p-channel transistor bodies adjusted together. This allows the preferred embodiment to be implemented using standard CMOS technologies, as opposed to other solutions that required individual transistor threshold adjustments and thus need isolated body structures such as those found in sflicon-on-insulator technologies.

Of course in other embodiments it may be desirable to adjust the source-to-body bias of only a portion of the devices on a chip. In this case, a mechanism will be needed to isolate the portion that is to be put into groggy mode from the rest of the chip. This can be accomplished using any type of silicon-on-insulator technology. Additionally, this can be accomplished using bulk CMOS formed within multiple wells. An example of such an implementation is described in pending U.S. patent application Ser. No. 08/866,674, filed on May 30, 1997, entitled "Method of Forming Self-Aligned Halo-Isolated Wells" and assigned to International Business Machines Corporation, and hereby incorporated by reference. The aforementioned disclosure describes a method for forming self-aligned double well structures; which could be used to implement this invention in where only a portion of the devices need to be put into groggy mode. Traditionally, CMOS technology has not been used for partitioned applications because of the difficulties involved in isolating transistors that would otherwise share a common substrate voltage. However, utilizing the solution provided in the aforementioned disclosure, a novel implementation is provided.

While the invention has been particularly shown and described with reference to a preferred exemplary embodiment thereof, it will be understood by those skilled in the art that various changes in form and details may be made therein without departing from the spirit and scope of the invention. It will be also understood that, while various of the conductors are shown in the drawing as single lines, they are not so shown in a limiting sense, and may comprise plural conductors, as is understood in the art. It will also be understood by those skilled in the art that the invention is applicable to different isolation technologies (e.g., LOCOS, recessed oxide (ROX), etc.), well and substrate technologies, dopant types, energies and species. It will also be understood that the spirit of the invention is applicable to other semiconductor technologies (e.g., BiCMOS, bipolar, silicon on insulator (SOI), silicon germanium (SiGe).

What is claimed is:

1. An apparatus for reducing power consumption in a circuit having an operational clock speed and a plurality of transistors, the apparatus comprising:

a clock speed adjustment mechanism, said clock speed adjustment mechanism decreasing the operational clock speed of said circuit while maintaining operation of said circuit at a reduced clock speed when said circuit has been inactive for a predetermined period of time; and a source-to-body voltage adjustment mechanism, said source-to-body voltage adjustment mechanism increasing the source-to-body voltage of said plurality of transistors after said operational clock speed has been decreased.

2. The apparatus of claim 1 wherein said source-to-body voltage adjustment mechanism decreases said source-to-body voltage of said plurality of transistors when said circuit becomes active.

3. The apparatus of claim 2 wherein said clock speed adjustment mechanism increases said operational clock speed when said circuit becomes active after said source-to-body voltage adjustment mechanism decreases said source-to-body voltage when said circuit becomes active.

4. The apparatus of claim 1 wherein said source-to-body voltage adjustment mechanism further comprises a voltage regulator, said voltage regulator providing a first voltage to n-channel transistor bodies and second voltage to p-channel transistor bodies.

5. The apparatus of claim 3 wherein said source-to-body voltage adjustment mechanism decreases said source-to-body voltage by supplying a voltage to n-channel transistor bodies equal to their source voltage and supplying a voltage to p-channel transistor bodies equal to their source voltage.

6. The apparatus of claim 1 wherein said clock speed adjustment mechanism includes clock capable of providing a clock signal at a first clock speed and said reduced clock speed, said first clock speed comprising a faster clock speed for operating said circuit when said source-to-body voltage of said transistors is zero, and said reduced clock speed comprising a slower clock speed for operating said circuit when said source-to-body voltage of said transistors is increased.

7. The apparatus of claim 1 further comprising an activity detection mechanism coupled to the circuit for detecting when said circuit is active.

8. The apparatus of claim 7 wherein said activity detection mechanism provides an activity signal when said circuit is active and continues to provide the activity signal for the predetermined period of time after said circuit is no longer active.

9. The apparatus of claim 7 wherein the activity detection mechanism includes a plurality of transition detectors and a pulse stretcher, said plurality of transition detectors coupled to a plurality of outputs of said circuit to detect when said circuit is active, said plurality of transition detectors coupled to said pulse stretcher, said pulse stretcher providing a signal when activity is detected by said transition detectors and for the predetermined time period thereafter.

10. The apparatus of claim 9 further comprising a first latch having a set input and a reset input, the first latch receiving the pulse stretcher output to said set input and receiving a delayed pulse stretcher output complement to said reset input, said first latch outputting a signal to said source-to-body voltage adjustment mechanism.

11. The apparatus of claim 10 further comprising a second latch having a set input and a reset input, the second latch receiving a pulse stretcher output complement to said reset input and receiving a delayed pulse stretcher output to said set input, said second latch outputting a signal to said clock speed adjustment mechanism.

12. The apparatus of claim 1 wherein the plurality of transistors are formed in unique region on a silicon on insulator (SOI) device.

13. The apparatus of claim 1 wherein the plurality of transistors are formed in unique wells within a complimentary metal oxide silicon (CMOS) device.

14. An apparatus for reducing power consumption in a circuit having an operational clock speed and a plurality of transistors, the apparatus comprising:

a clock speed adjustment mechanism, said clock speed adjustment mechanism decreasing the operational clock speed of said circuit when said circuit has been inactive for a predetermined period of time while maintaining operation of said circuit at a reduced clock speed, said clock speed adjustment mechanism increasing said operational clock speed when said circuit becomes active; and a source-to-body voltage adjustment mechanism, said source-to-body voltage adjustment mechanism increasing the source-to-body voltage of said plurality of transistors after said operational clock speed has been decreased when said circuit has been inactive for said predetermined period of time, said source-to-body voltage adjustment mechanism decreasing said source-to-body voltage of said plurality of transistors before said operational clock speed is increased when said circuit becomes active.

15. The apparatus of claim 14 wherein said source-to-body voltage adjustment mechanism further comprises a voltage regulator, said voltage regulator providing a first voltage to n-channel transistor bodies and second voltage to p-channel transistor bodies, wherein said first voltage is substantially equal to the source voltage of the n-channel transistors and the second voltage is substantially equal to the source voltage of the p-channel transistors when said source-to-body voltage is decreased, and wherein said first voltage is higher than said source voltage of the n-channel transistors and said second voltage is lower than said source voltage of the p-channel transistors when said source-to-body voltage is increased.

16. The apparatus of claim 15 wherein said first voltage is higher than said source voltage of the n-channel transistors by approximately 200–500 mV and said second voltage is lower than said source voltage of the p-channel transistors by approximately 200–500 mV when said source-to-body voltage is increased.

17. The apparatus of claim 15 wherein said first voltage is higher than said source voltage of the n-channel transistors an amount selected to decrease sub-threshold current by a factor of greater than approximately 100 when said source-to-body voltage is increased, and where said second voltage is lower than said source voltage of the p-channel transistors an amount selected to decrease sub-threshold current by a factor of greater than approximately 100 when said source-to-body voltage is increased.

18. The apparatus of claim 14 further comprising an activity detection mechanism for detecting when said circuit is active, wherein said activity detection mechanism provides an activity signal when said circuit is active and for the predetermined period of time after said circuit is no longer active.

19. The apparatus of claim 18 wherein the activity detection mechanism includes a plurality of transition detectors and a pulse stretcher, said plurality of transition detectors coupled to a plurality of outputs of said circuit to detect when said circuit is active, said plurality of transition detectors coupled to said pulse stretcher, said pulse stretcher providing a signal when activity is detected by said transition detectors and for the predetermined time period after.

20. The apparatus of claim 19 further comprising;

a first latch having a set input and a reset input, the first latch receiving the pulse stretcher output to said set input and receiving a delayed pulse stretcher output complement to said reset input, said first latch outputting a signal to control said source-to-body voltage adjustment mechanism; and a second latch having a set input and a reset input, the second latch receiving a pulse stretcher output complement to said reset input and receiving a delayed pulse stretcher output to said set, input, said first latch outputting a signal to said clock speed adjustment mechanism.

21. The apparatus of claim 14 wherein the plurality of transistors are formed in a unique region on a silicon on insulator (SOI) device.

22. The apparatus of claim 14 wherein the plurality of transistors are formed in unique wells within a complimentary metal oxide silicon (CMOS) device.

23. A method for reducing power consumption in an circuit during inactivity, the circuit having an operational clock speed and a plurality of transistors, the method comprising the steps of:

decreasing the operational clock speed of said circuit while maintaining operation of said circuit at a reduced clock speed when said circuit has been inactive for a predetermined period of time; and increasing the source-to-body voltage of said plurality of transistors after said operational clock speed as been decreased.

24. The method of claim 23 further comprising the steps of decreasing the source-to-body voltage of said plurality of transistors when said circuit becomes active again.

25. The method of claim 24 further comprising the step of increasing said operational clock speed after the step of decreasing the source-to-body voltage of said plurality of transistors when said circuit becomes active again.

26. The method of claim 23 wherein the step of increasing the source-to-body voltage of the plurality of transistors comprises providing a first voltage to n-channel transistor bodies and second voltage to p-channel transistor bodies.

27. The method of claim 26 wherein the first voltage comprises a voltage greater than the source voltage of n-channel transistors and the second voltage comprises a voltage less than the source voltage p-channel transistor bodies.

28. The method of claim 24 wherein the step of decreasing the source-to-body voltage of the plurality of transistors comprises providing a voltage to n-channel transistor bodies substantially equal to n-channel transistor sources and providing a voltage to p-channel transistor bodies substantially equal to p-channel transistor sources.

29. The method of claim 23 wherein the step of decreasing the operational clock speed of said circuit when said circuit has been inactive for a predetermined period of time comprises monitoring outputs of said circuit for transitions and providing an inactive signal when said circuit outputs have been inactive for the predetermined period of time.

30. The method of claim 29 wherein the step of providing an inactive signal comprises inputting a signal to a pulse stretcher when transitions are detected on the outputs of said circuit.

31. The method of claim 30 further comprising the steps of:

setting a first latch by an output of the pulse stretcher and resetting the first latch by a delayed pulse stretcher output complement; and setting a second latch by a delayed output of the pulse stretcher and resetting the second latch by a pulse stretcher output complement.

32. The method of claim 23 wherein the step of decreasing the operational clock speed includes providing a clock capable of providing a clock signal at a first clock speed and said reduced clock speed, said first clock speed comprising a faster clock speed for operating said circuit when said source-to-body voltage of said transistors is zero, and said second clock speed comprising a slower clock speed for operating said circuit when said source-to-body voltage of said transistors is increased.

33. A method for reducing power consumption in an circuit during inactivity while maintaining full functionality, the circuit having an operational clock speed and a plurality of n-channel transistors and a plurality of p-channel transistors, the method comprising the steps of:

decreasing the operational clock speed of said circuit when said circuit has been inactive for a predetermined period of time while maintaining operation of said circuit at a reduced clock speed;

increasing the body voltage of said n-channel transistors and decreasing the body voltage of said p-channel transistors after said operational clock speed has been decreased;

decreasing the body voltage of said n-channel transistors to substantially equal the source voltage of said n-channel transistors and increasing the body voltage of said p-channel transistors to substantially equal to the source voltage of said p-channel transistors when said circuit becomes active again;

increasing said operational clock speed after the body voltage of the n-channel transistors has been decreased and the body voltage of the p-channel transistors has been increased when said circuit becomes active again.

34. The method of claim 33 wherein the step of decreasing the operational clock speed of said circuit when said circuit has been inactive for a predetermined period of time comprises monitoring outputs of said circuit for transitions and providing an inactive signal when said circuit outputs have been inactive for the predetermined period of time.

* * * * *